United States Patent [19]

Pearson

[11] Patent Number: 5,477,364
[45] Date of Patent: Dec. 19, 1995

[54] DATA TRANSMISSION ON OPTICAL NETWORKS

[75] Inventor: Ian D. Pearson, Ipswich, England

[73] Assignee: British Telecommunications public limited company, London, England

[21] Appl. No.: 447,211

[22] Filed: May 22, 1995

Related U.S. Application Data

[63] Continuation of Ser. No. 227,688, Apr. 14, 1994, abandoned, which is a continuation of Ser. No. 828,880, filed as a PCT/GB90/01129, Jul. 23, 1990, abandoned.

[30] Foreign Application Priority Data

Jul. 21, 1989 [GB] United Kingdom .................. 8916720

[51] Int. Cl.$^6$ ............................. H04J 14/08; H04J 14/00
[52] U.S. Cl. ........................ 359/139; 359/137; 359/117; 370/60.1; 370/85.7; 370/94.1
[58] Field of Search ................................... 357/115, 117, 357/118, 123, 124, 125, 135, 136, 137, 138, 139, 140; 370/60, 60.1, 82, 83, 85.7, 94.1, 94.2

[56] References Cited

U.S. PATENT DOCUMENTS

| | | | |
|---|---|---|---|
| 4,704,606 | 11/1987 | Hasley | 370/82 |
| 4,736,462 | 4/1988 | Joel, Jr. | 359/139 |
| 4,792,944 | 12/1988 | Takahashi et al. | 370/84 |
| 4,876,682 | 10/1989 | Graves et al. | 370/84 |
| 4,887,261 | 12/1989 | Roempp | 370/84 |
| 4,926,420 | 3/1990 | Shimizu | 370/82 |
| 4,939,721 | 7/1990 | De Bosio | 359/139 |
| 4,939,722 | 7/1990 | Beichler | 370/84 |
| 5,050,166 | 9/1991 | Cantoni et al. | 370/82 |
| 5,105,292 | 4/1992 | Le Roy et al. | 359/123 |
| 5,278,689 | 1/1994 | Gitlin et al. | 359/137 |
| 5,295,012 | 3/1994 | Wilson et al. | 359/137 |
| 5,315,596 | 5/1994 | Lee | 370/84 |

FOREIGN PATENT DOCUMENTS

| | | | |
|---|---|---|---|
| 0295857 | 12/1988 | European Pat. Off. | H01S 3/03 |
| 0313389 | 4/1989 | European Pat. Off. | H04L 11/20 |
| 3211966 | 10/1983 | Germany | H04B 3/00 |

OTHER PUBLICATIONS

"Architecture of Optical Processing for Communications", OSA Proceedings Mar. 1, 1989 pp. 286–290.
"Diffusion Assisted Optical Switch: A New Optical Logic Device," Photonic Switching Technical Digest Mar. 1, 1989 p. 78–39.
"An All–Optical Shift Register Using Symmetric Self Electro–Optic Effect Devices", Photonic Switching Technical Digest Mar. 1, 1989 pp. 61–63.
"Photonic Switching Systems", H. S. Hinton, ECOC '88 IEE 14th Conference on Optical Communications.
InGaAsP/InP Optical Gate Controlled ECOC '88. IEE 14th Conference pp. 316–317.
"Optical Processing in Photonic Switching Systems" OSA Proceedings Mar. 1, 1989 pp. 272–279.
"Optical Parallel Processor for Control of Photonic Switching Networks", OSA Proceedings Mar. 1, 1989 pp. 280–285.
"All–Optical Signal Routing Using Bistable Interferometers", Photonic Switching Technical Digest Mar. 1, 1989 pp. 126–128.
"Photonic Switches Set to Prosper", Zucker & Alferness Physics World Sep. 1991.

(List continued on next page.)

Primary Examiner—Leo H. Boudreau
Assistant Examiner—Rafael Bacares
Attorney, Agent, or Firm—Nixon & Vanderhye

[57] ABSTRACT

A system for transmitting data cells from a transmitter to a receiver is disclosed with each cell having a fixed format header containing address information and a free format time slice of predetermined duration. The cells may be transmitted on an optical network in which case the cells are routed by an optical switch which reads the header and is transparent to the free format time slice. Second level cells are formed comprising a second level header and a time slice filled with a number of first level cells.

8 Claims, 3 Drawing Sheets

OTHER PUBLICATIONS

"The Pursuit of Photons", Michael Warr, Telephony Magazine Dec. 23, 1991.

Journal of Lightwave Technology, vol. LT–3, No. 3, Jun. 1985, IEEE, (New York, US), T. Hermes et al: "LOCNET—A local area network using optical switching", pp. 467–471.

IBM Technical Disclosure Bulletin, vol. 32, No. 4B, Sep. 1989 (Armonk, N.Y. US), "Passive optical star with a tunable receiver for hybrid access control and overflow prevention", pp. 331–337.

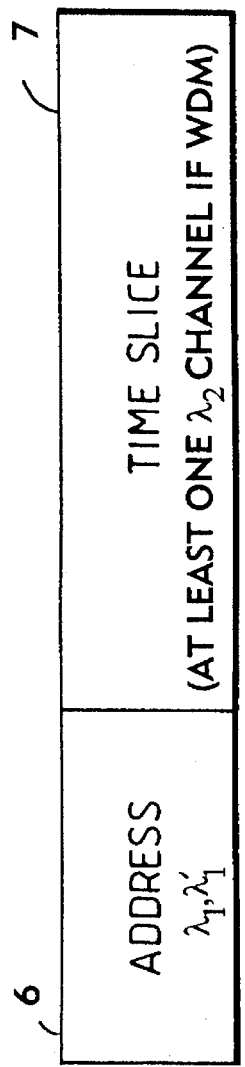
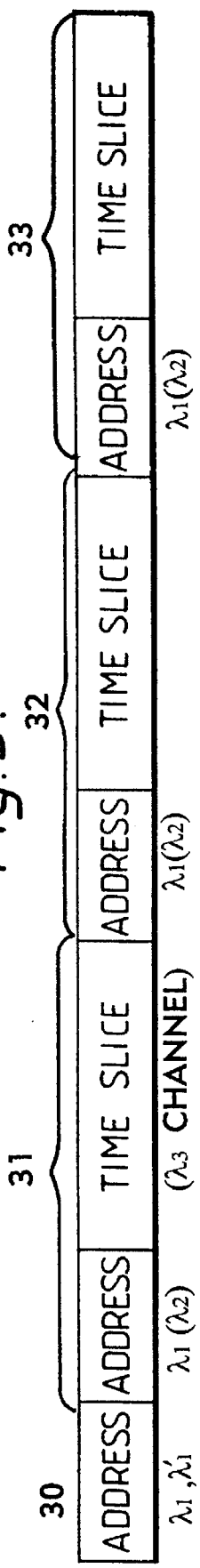

DATA TRANSMISSION ON OPTICAL NETWORKS

This is a continuation of application Ser. No. 08/227,688, filed Apr. 14, 1994, which is a continuation of application Ser. No. 07/828,880, filed filed as a PCT/GB90/01129, Jul. 23, 1990.

BACKGROUND OF THE INVENTION

1. Field of the Invention

The present invention relates to the transmission of packets or cells of data on a network.

2. Description of the Related Art

In most known cell based communication systems each cell is divided into a certain number of bytes forming a header which contains address and other system information, followed by a number of bytes or part-bytes in which a data source writes the information to be transmitted. Although the source is unconstrained as the nature of the data it writes, the format used for writing the data has to match that used in the header. For example, the bit rate and line codes used in writing the data have to correspond to those used in the header. The format of the header in turn is necessarily fixed since it must be capable of being read at any node in the network.

SUMMARY OF THE INVENTION

According to the present invention in a system for transmitting data cells from a transmitter to a receiver via a network, each cell comprises a fixed format header containing at least addresser routing information, and characterised in that each cell comprises a free format time slice of predetermined duration.

The present invention provides a cell based communication system which departs radically from the above known systems and offers many advantages instead of using cells of unitary format the present invention effectively decouples the formats of the header and the information bearing portions of each cell. The fixed format header is followed by or associated with a time slice which the data source is free to fill in any manner appropriate to the information being carried. Thus the time slice may be filled with a digital signal of any bit rate, with an analogue signal or just with a region of the optical spectrum containing, for example, a group of discrete wavelengths. The format, information rate, and meaning of the information field are limited only by the requirements of the receiver and the system bandwidth. The flexibility of the system is such that, for example, a network user having the capability to transmit at a higher data rate than that used for the header is free to use that higher rate to put data onto the network, and can squeeze much more information into the cell than would be possible in a conventional system which limited the data rate to that of the header. The system offers savings in the cost of transmission equipment and pre-transmission equipment such as codecs.

A packet switching system is known from EP-A-0313389 in which high speed data packets are switched through an optical switch by means of a header comprising respective control wavelengths. In this case although the format of the data in the packet does not match that of the header, it will be understood that both formats are fixed (in the sense of the present invention) and the system is thus limited to handling data input in the same predetermined format, unlike the system of the present invention.

The system of the present invention which uses time slices with attached addresses has been termed by the inventor an addressed time slice (ATS) transport system.

Preferably the transmitter includes a data source arranged to fill the time slice with data for transmission and a transmission unit transparent to the time slice and arranged to attach the fixed format header to the time slice and to transmit the cell onto the network. The header may be attached in the sense of being associated with the time slice in a signalling channel.

Preferably the network includes routing means arranged to read information from the fixed format header and to route the cell accordingly, the routing means being transparent to the time slice.

Preferably the network is an optical network and the routing means is an optical switch arranged to read the header in the optical domain.

The system of the present invention may be used with wavelength division multiplexing (WDM). In this case preferably the ATS cell comprises a single wavelength header and a time slice including at least one channel at a different respective wavelength.

Preferably the cell comprises a plural wavelength header and a time slice including at least one channel at a different respective wavelength.

A plurality of cells may share the same time slice with their headers multiplexed on the single wavelength or on the plurality of wavelengths, as the case may be.

The system of the present invention may be extended by varying the size of the time slice at the different hierarchical levels of the network. In this case preferably a second level cell is formed comprising a second-level header containing at least second level address or routing information and a second level time slice comprising a plurality of first level ATS cells. This arrangement may allow a higher throughput where there would otherwise be a bottleneck at the routing stage.

BRIEF DESCRIPTION OF THE DRAWINGS

A system in accordance with the present invention will now be described in detail with reference to the figures of the accompanying drawings in which:

FIG. 2 is a diagram of an ATS cell;

FIG. 3 is a diagram of a second level ATS cell; and

DETAILED DESCRIPTION OF THE PREFERRED EMBODIMENTS

Figure 1A:
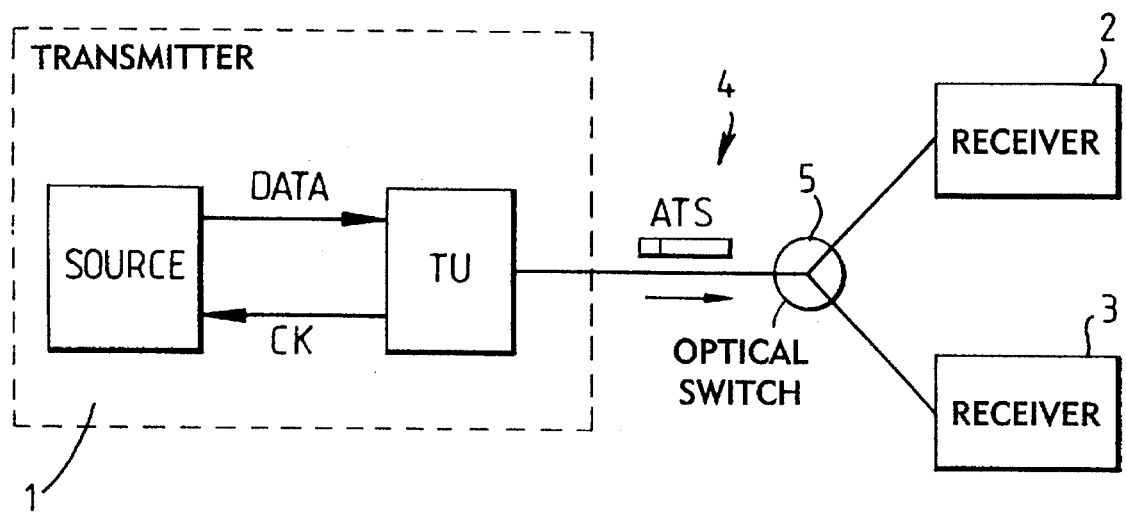
FIG. 1 is a diagram of a network.

A data communication system comprises a transmitter and receivers 2, 3 linked to the transmitter 1 via an optical network 4. Although for clarity a simple network with a single branch and two receivers is shown, in practice the present invention is applicable to a wide range of network topologies and typically data will be routed to one or more of a large number of receivers. The network includes an optical switch 5 arranged to route data to a selected one of the receivers 2, 3.

The transmitter 1 transmits data onto the network in addressed time slice (ATS) cells. The cell format shown in FIG. 2 comprises a header 6 which carries header information in the form of address information only and a time slice 7. The time slice 7 which is of predetermined duration but is otherwise of unfixed format is filled with data from the data source under control of a signal from a transmission unit TU which is transparent to the data from the data source. The data may, for example, take the form of an amplitude modulated analogue signal. To this signal filling the time slice 7 the transmission unit TU adds an address 5 which is of a fixed format for a given network. Although in the present example the header contains address information only, in general additional information may be included in the header when needed for a particular system. In the present example, the header is 4 bytes long and is encoded at a bit rate of substantially 155 Mbit/s. The ATS cell formed in this manner is transmitted onto the network and is received by the switch 5. The switch 5 reads the header and directs the cell to one of the receivers 2,3 accordingly. The data in the time slice is not read at the switch 5 and is transmitted intact.

At the receiver 2, 3 the header 6 is stripped off and the data in the time slice 7 decoded in a manner appropriate to the method of encoding used. In the present example, using analogue encoding, a simple photoelectric cell suffices to convert the encoded data to an electrical signal suitable for further processing as appropriate.

Figure 1B:
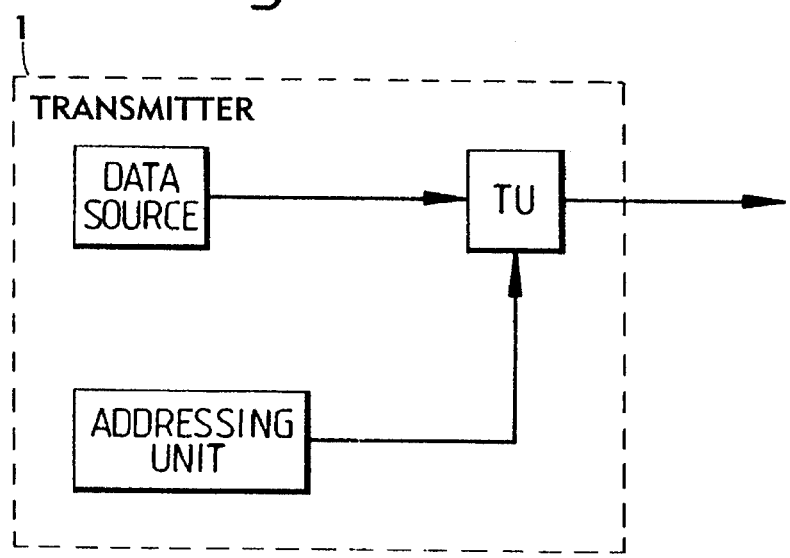

FIG. 1B shows an alternative arrangement for the transmitter 1 in which separate sources are provided for the data and header information and the complete ATS cells are assembled at the transmission unit TU.

The system may be extended hierarchically by forming higher level ATS cells are comprising a header with address information appropriate to the particular level and a time slice filled with a number of lower level cells. FIG. 3, for example, shows a second level cell formed by a header 30 containing a second level address and a time slice filled with three first level cells 31, 32, 33.

Figure 4:
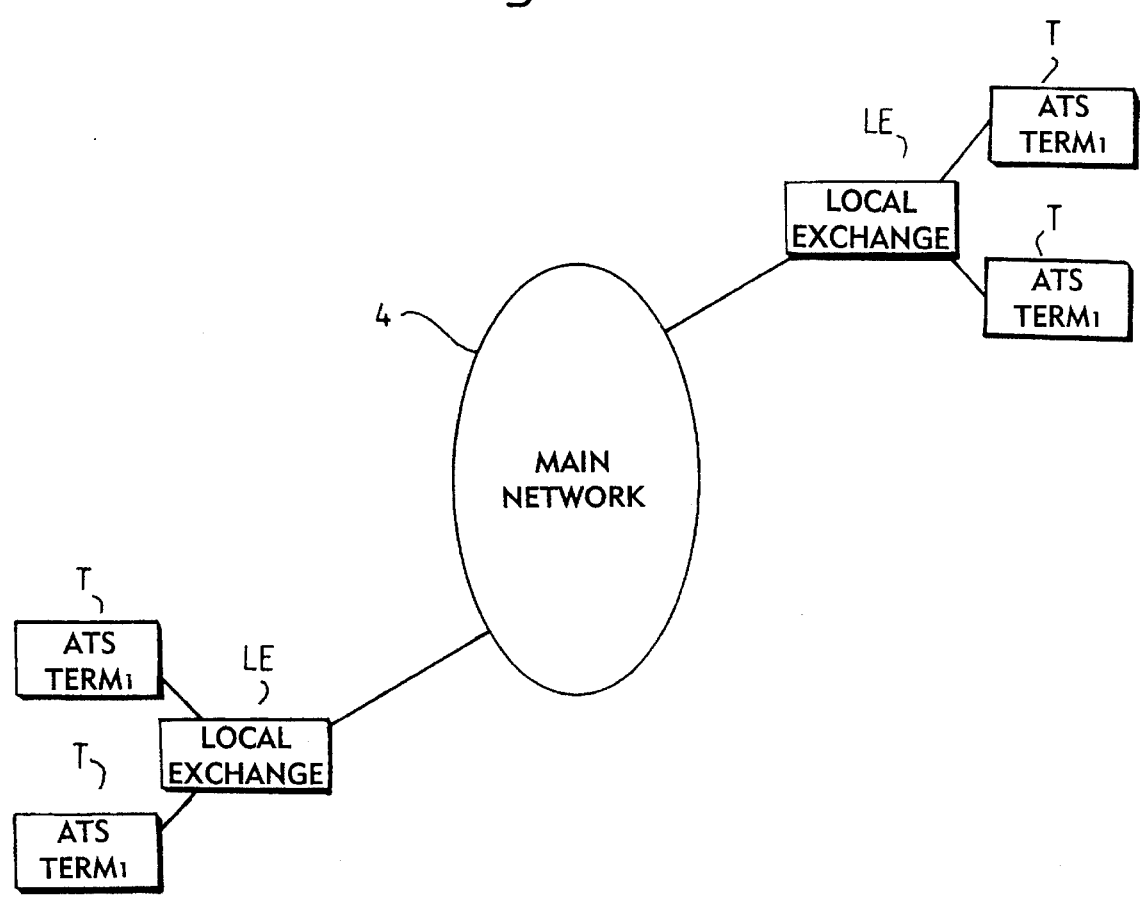
FIG. 4 is a diagram of a network with local exchanges.

In FIG. 4, when an ATS terminal T (comprising a transmitter 1 and a receiver 2) wants to make a call it sends a first cell to a local exchange LE (sometimes referred to as a head-end) intermediate the terminal T and the main network 4. This cell contains the information necessary for the local exchange LE to set up the call, and is sent at a basic data rate of 34 Mbit/s. Part of the information in this first cell declares the data rate that the terminal will use for further headers (either for the call duration or for all future calls). The local exchange LE will regenerate the headers at a network header rate of 565 Mbit/s for onward transmission on the network 4. If the destination terminal T does not operate at this header rate then the remote local exchange LE will convert down to the required rate. Thus smooth network evolution is possible, slow terminals can function at the basic rate, and the network header rate can be changed without affecting the terminals.

Terminals can be arranged to respond to a polling cell issued by a local exchange by returning a cell at basic data rate, even though such a terminal is designed for high speed normal transmission of data. In this way the local exchange can process all returning cells at the known basic data rate regardless of the normal operating rate of a terminal which can be one of a number of data rates.

Whereas in the above described system the header information is in the form of address information, it will be appreciated that it can alternatively be in the form of routing information. Furthermore, the header information may include some control information which may comprise a 1 bit flag to indicate whether the time slice needs to be treated transparently. Instead of the header including such an indication, the first cell can contain a field, which again may be a single bit, to indicate this requirement.

Whereas in the described system the header is attached to the front of the data in the time slice in the same transmission channel (wavelength), the header may be provided ("attached") at a wavelength different from that of the data of the time slice. This enables a plurality of cells to share the same time slice with their headers on a common signalling channel, and there can be a respective signalling channel for different signalling rates, e.g. 34 Mbit/s, 140 Mbit/s or 565 Mbit/s.

An advantage of using a common channel for the headers is that the system can handle ATM (asynchronous transfer mode) packets and copy the ATM header into the common channel.

I claim:

1. A system including a switch for transmitting data cells from a particular transmitter to a particular receiver via a network in accordance with address or routing information supplied by the transmitter, in which each cell comprises:

a fixed format header containing at least address or routing information which is used by the switch to connect a transmitter with the intended receiver, and a free format time slice of predetermined duration containing information that is not read at the switch but which is passed along intact to the receiver determined by said address or routing information, in which free format time slice the user has complete freedom to choose any form and format of signalling including at least both analog and digital formats and, if digital, the freedom to choose any number of bits sent within each time slice.

2. A system according to claim 1, in which the transmitter includes:

a data source connected to fill the time slice with data for transmission, and a transmission unit transparent to the time slice and connected to attach the fixed format header to the time slice and to transmit the cell onto the network.

3. A system according to claim 1, in which the network includes routing means arranged to read information from the fixed format header and to route the cell accordingly, the routing means being transparent to the time slice.

4. A system according to claim 3, in which the network is an optical network and the routing means is an optical switch arranged to read the header in the optical domain.

5. A system including a switch for transmitting data cells from a particular transmitter to a particular receiver via a network in accordance with address or routing information supplied by the transmitter, in which each cell comprises:

a fixed format header containing at least address or routing information which is used by the switch to connect a transmitter with the intended receiver, and a free format time slice of predetermined duration containing information that is not read by the switch but which is passed along intact to the receiver determined by said address or routing information, in which free format time slice the user has complete freedom to choose any form and format of signalling including complete freedom to choose any number of bits sent within each time slice, the network including routing means arranged to read information from the fixed format header and to route the cell accordingly, the routing means being transparent to the time slice, the network including an optical network and the routing means including an optical switch arranged to read the header in the optical domain, the cell comprising a single wavelength header associated with a time slice including at least one channel at a wavelength that is different than the wavelength used for the header.

6. A system including a switch for transmitting data cells from a particular transmitter to a particular receiver via a network in accordance with address or routing information supplied by the transmitter, in which each cell comprises:

- a fixed format header containing at least address or routing information which is used by the switch to connect a transmitter with the intended receiver, and
- a free format time slice of predetermined duration containing information that is not read by the switch but which is passed along intact to the receiver determined by said address or routing information, in which free format time slice the user has complete freedom to choose any form and format of signalling including complete freedom to choose any number of bits sent within each time slice,
- the network including routing means arranged to read information from the fixed format header and to route the cell accordingly, the routing means being transparent to the time slice,
- the network including an optical network and the routing means including an optical switch arranged to read the header in the optical domain,
- the cell comprising a plural wavelength header associated with a time slice including at least one channel at a wavelength that is different than any of the wavelengths used for the header.

7. A system according to claim 5, in which a plurality of cells share the same time slice with their headers multiplexed on the single wavelength or on the plurality of wavelengths, as the case may be.

8. A system according to claim 1, including plural transmitters and plural receivers in said network and in which said data cells include:

- first level cells produced by at least one transmitter and having a fixed format header containing at least first level address or routing information directing associated information packets to particular respective destinations, and
- a second level cell produced by a transmitter and having a second level header containing at least second level address or routing information and a second level time slice comprising a plurality of the first level cells directing an associated group of said information packets of said first level cells to follow a common route along at least a portion of their journey to said particular respective destinations,
- said first level cells being transmitted from said transmitter to different receivers within the network.

* * * * *